United States Patent
Nam et al.

(10) Patent No.: US 11,212,474 B2
(45) Date of Patent: Dec. 28, 2021

(54) BIDIRECTIONAL TDI LINE IMAGE SENSOR

(71) Applicant: VIEWORKS CO., LTD., Anyang (KR)

(72) Inventors: Jung Hyun Nam, Suwon (KR); Kyoung Ryoul Seo, Suwon (KR)

(73) Assignee: VIEWORKS Co., LTD., Anyang (KR)

( * ) Notice: Subject to any disclaimer, the term of this patent is extended or adjusted under 35 U.S.C. 154(b) by 745 days.

(21) Appl. No.: 16/332,801

(22) PCT Filed: May 14, 2015

(86) PCT No.: PCT/KR2015/004856
§ 371 (c)(1),
(2) Date: Jun. 14, 2019

(87) PCT Pub. No.: WO2015/174762
PCT Pub. Date: Nov. 19, 2015

(65) Prior Publication Data
US 2020/0068154 A1   Feb. 27, 2020

(30) Foreign Application Priority Data

May 15, 2014 (KR) .......................... 10-2014-0058502

(51) Int. Cl.
*H04N 5/372* (2011.01)
*H04N 3/14* (2006.01)

(52) U.S. Cl.
CPC .......... *H04N 5/372* (2013.01); *H04N 3/1525* (2013.01)

(58) Field of Classification Search
CPC .......................... H04N 5/372; H04N 3/1525
See application file for complete search history.

(56) References Cited

U.S. PATENT DOCUMENTS 6,633,058 B1 * 10/2003 O. ..................... H01L 27/14831
257/225
6,831,998 B1   12/2004 Koshishiba et al.
(Continued)

FOREIGN PATENT DOCUMENTS

CN   102811321 A   12/2012
CN   102970474 A   3/2013
(Continued)

OTHER PUBLICATIONS

International Search Report dated Aug. 3, 2015 for PCT/KR2015/004856.
(Continued)

*Primary Examiner* — Michael E Teitelbaum
(74) *Attorney, Agent, or Firm* — Rabin & Berdo, P.C.

(57) ABSTRACT

The present disclosure provides a bidirectional TDI line image sensor. The bidirectional TDI line image sensor according to one embodiment of the present invention comprises: a pixel unit, which has N line sensors having M CCDs arranged in a line and being arranged in a scan direction, moves, in the scan direction, charges accumulated in the respective columns of the line sensors, and accumulates the same; and an output unit for parallelly receiving as inputs the charges accumulated in the pixel unit from the respective columns, performing analog-to-digital conversion on and storing the charges, and then sequentially outputting same.

15 Claims, 3 Drawing Sheets

(56) References Cited

U.S. PATENT DOCUMENTS

| | | | |
|---|---|---|---|
| 7,796,174 B1 * | 9/2010 | Harwit | H04N 5/37206 348/311 |
| 2003/0197857 A1 * | 10/2003 | Yamashita | G01N 21/95607 356/237.2 |
| 2013/0057931 A1 | 3/2013 | Mayer et al. | |
| 2013/0112853 A1 | 5/2013 | Suyama et al. | |
| 2014/0054443 A1 | 2/2014 | Faramarzpour et al. | |

FOREIGN PATENT DOCUMENTS

| | | |
|---|---|---|
| CN | 103022067 A | 4/2013 |
| JP | H09-93490 A | 4/1997 |
| JP | H10-257269 A | 9/1998 |
| JP | H11-032166 A | 2/1999 |
| JP | 2013-098420 A | 5/2013 |
| JP | 201398420 A | 5/2013 |
| JP | 5941659 B2 | 6/2016 |
| KR | 2000-0018460 A | 4/2000 |
| KR | 2007-0068201 A | 6/2007 |
| KR | 2009-0023573 A | 3/2009 |
| WO | 2014-021417 A | 2/2014 |

OTHER PUBLICATIONS

Nie, Kaiming et al., Thirty Two-Stage CMOS TDI Image Sensor With On-Chip Analog Accumulator, IEEE Transactions on Very Large Scale Integration (VLSI) Systems, Apr. 2014, 22(4): 951-956.

* cited by examiner

BIDIRECTIONAL TDI LINE IMAGE SENSOR

CROSS-REFERENCE TO RELATED APPLICATIONS

This application claims the benefit of and priority to Korean Patent Application No. 10-2014-0058502, filed on May 15, 2014, and International Application No. PCT/KR2015/004856, filed on May 14, 2015, which are hereby incorporated by reference as if fully set forth herein.

FIELD

Exemplary embodiments of the present invention relate to a bidirectional time delay integration (TDI) line image sensor. Particularly, exemplary embodiments of the present invention relate to a bidirectional TDI line image sensor in which a pixel unit includes charge-coupled devices (CCDs) configured in accordance with a TDI method, and an output unit receives charges, which are accumulated at respective columns of CCDs of first and last line sensors in the pixel unit, selectively according to a scan direction, performs analog-to-digital (AD) conversion on the received charges, stores the resulting signals in a memory buffer, and then sequentially outputs the stored signals.

BACKGROUND

Recently, with mass production, automation, and refinement of production facilities, functions which rely on the naked eyes of a human or various types of sensors have been increasingly replaced by vision machines including image sensors. Charge-coupled devices (CCDs) are semiconductor devices that are mainly used in image sensors.

A CCD refers to a device capable of transmitting charges from one device to another adjacent device. An image sensor including CCDs has a structure in which the change of the amount of free charges in each cell caused by an amount of light is converted into an electrical signal.

Structurally, a CCD generally includes a cell area in which charges are substantially accumulated due to an amount of light, and an output unit including a shift register which serves as a path through which the accumulated charges are sequentially transmitted.

Operating methods of CCDs are generally divided into the area scan method, the line scan method, the time delay integration (TDI) line scan method, and the like, depending on how cells are arranged in the arrays, and images are generated.

An image sensor using the line scan method (hereinafter referred to as a "line sensor") is a one-dimensional sensor in which pixels that receive image light are arranged in a line. When a two-dimensionally widened image is taken, the subject is sequentially imaged line-by-line by moving the line sensor or the subject.

That is, the line scan method is a method in which one line is exposed and transmitted at a certain speed at a time, and has an advantage in that high-speed and high-resolution images can be obtained at a low cost compared to the area scan method. For example, in order to obtain a frame having a size of 2048*2048, only 2K pixels are required in the line scan method, compared to 4M pixels in the area scan method. Further, frames having various sizes such as 2048 * 2048, 2048*1000, and the like can be obtained using the same 2K pixels.

However, when a high-speed scan method, in which a subject moving at a high speed is imaged or a subject is imaged by a line sensor moving at a high speed, is performed, the time during which charges can be accumulated per line is reduced because the accumulation and transmission of charges at a high speed needs to be repeated in each line, and thus the amount of light received for the image becomes insufficient. Thus, a greater amount or intensity of light needs to be received, but the amount or intensity of light cannot be indefinitely increased due to the lighting devices' limitations.

Accordingly, while research on increasing sensitivity by improving materials of a pinned-photodiode (PPD), a complementary metal-oxide-semiconductor (CMOS) sensor, and the like has been conducted, a method for accumulating a greater amount of light by arranging several line sensors together to increase sensitivity has been proposed.

In an image sensor using the TDI line scan method (hereinafter referred to as a "TDI line image sensor"), line sensors are arranged for a plurality of stages in the scan direction, charges accumulated in CCDs in each line are synchronized with the movement of an image, and are transmitted to CCDs in the next line. The charges are superimposed and are then output by repeating the process until the last line sensor, and, as a result, an image having a sufficient amount of light can be obtained even in a high-speed scan method.

The related art of the present invention is disclosed in Korean Patent Application Publication No. 2009-0023573 (published on Mar. 5, 2009, Invention Title: A method for Controlling a TDI-CCD Image Sensor).

SUMMARY

Exemplary embodiments of the present invention are directed to providing a time delay integration (TDI) line image sensor in which charges accumulated in charge-coupled devices (CCDs) in each line are moved in the scan direction to CCDs in an adjacent next line, are moved to a last line and accumulated, and are then output to a signal processing unit by moving the charges accumulated in the last line perpendicularly to the scan direction, and data with respect to each cell may be sequentially processed in units of lines.

As described above, when the charges accumulated in the CCDs are moved in the scan direction to an adjacent line, the charges are moved in parallel by being synchronized with the movement of an image. However, when the accumulated charges are perpendicularly moved to be output to the signal processing unit, since the accumulated charges are transmitted by serially moving the accumulated charges one-by-one in a stopped state, there is a problem in that it takes much time when the accumulated charges are moved perpendicularly.

Particularly, in the TDI line image sensor, because the number of CCDs perpendicularly arranged in series in each line is relatively greater than the number of lines arranged in the scan direction in order to have a high resolution, there is a problem in that the accumulated charges moving and being output perpendicularly tend to delay the overall scanning process by the TDI line sensor.

Further, when it comes to a bidirectional TDI line sensor, it is advantageous that it can reduce its scanning time because it can scan and take images in two directions. However, it conventionally has output components in both the first and last line sensors, which makes the size of the sensor larger.

Embodiments of the present invention are provided to address the above-described problems, and it is an object of the present invention to provide a bidirectional time delay integration (TDI) line image sensor in which the pixel unit includes charge-coupled devices (CCDs) configured in accordance with a TDI method, and the output unit receives charges of respective columns accumulated at the CCDs of the first and last line sensors of the pixel unit selectively according to its scan direction, performs analog-to-digital (AD) conversion on the received charges at one output component, stores the resulting signals in a memory buffer, and then sequentially outputs the stored signals, thereby improving its resolution and transmission rate and reducing power consumption and noise, owing to the characteristics of CCDs and complementary metal-oxide-semiconductor (CMOS) devices. Further, the device size can be reduced owing to the common configuration of the output component.

One aspect of the present invention provides a bidirectional TDI line image sensor, the sensor including a pixel unit including line sensors having M charge-coupled devices (CCDs) arranged in a line, wherein N line sensors are arranged in the scan direction, configured to move, in the scan direction, charges accumulated in respective columns of the line sensors and accumulate the charges, and an output unit configured to receive, parallelly as inputs, the charges accumulated at the respective columns of the first or last line sensor of the pixel unit, selectively depending on the scan direction, to perform analog-to-digital (AD) conversion on the charges, to store the charges, and then to sequentially output the charges.

The output unit according to one embodiment of the present invention may include M first amplifiers configured to receive the charges accumulated in the first line sensors of the pixel unit in parallel at corresponding charge storage nodes of respective columns and amplify the received charges, M second amplifiers configured to receive the charges accumulated in the last line sensor of the pixel unit in parallel at corresponding charge storage nodes of respective columns and amplify the received charges, a MUX configured to select either of the first amplifiers and the second amplifiers according to the scan direction, M AD converters configured to AD-convert output signals from the MUX, respectively, and a memory buffer configured to store output signals from the AD converters and sequentially output the stored signals.

The first amplifiers and the second amplifiers may be source follower amplifiers.

A bidirectional time delay integration (TDI) line image sensor according to exemplary embodiments of the present invention includes a pixel unit configured to perform in accordance with the TDI method by means of CCD devices and a single output unit configured to receive, parallelly as inputs, the charges accumulated at the respective columns of the first or last line sensor's CCDs of the pixel unit, selectively depending on the scan direction, to perform AD conversion of the received charges, to store the charges in a memory buffer, and to sequentially output the charges, thereby improving the resolution and transmission rate and reducing power consumption and noise due to the characteristics of CCDs and complementary metal-oxide-semiconductor (CMOS) devices. Further, the above-described bidirectional TDI line image sensor according to exemplary embodiments of the present invention can contribute to reducing the size of the device by configuring the output unit commonly.

DETAILED DESCRIPTION OF EXEMPLARY EMBODIMENTS

Figure 1:
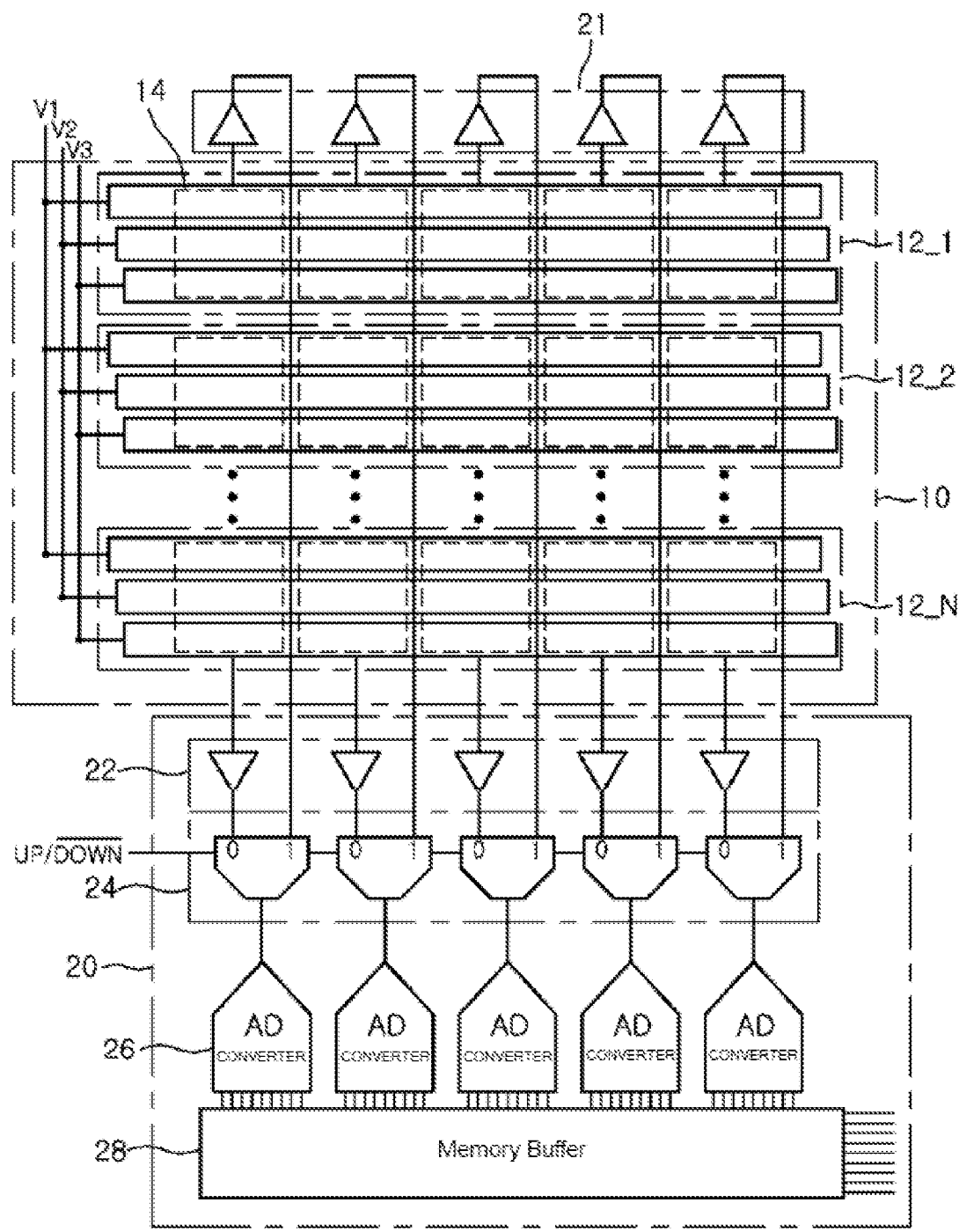
FIG. 1 is a block diagram showing the configuration of a bidirectional time delay integration (TDI) line image sensor according to one exemplary embodiment of the present invention.

Hereinafter, a bidirectional time delay integration (TDI) line image sensor according to one embodiment of the present invention will be described with reference to the accompanying drawings. In this process, the thickness of lines, the size of components, and the like illustrated in the drawings may be exaggerated for clarity and convenience of description.

Further, some terms which will be described below are defined in consideration of functions in the present invention, and their meanings may vary depending on, for example, the user or operator's intention or custom. Therefore, the meanings of these terms should be interpreted based on the scope throughout this specification.

Figure 2:
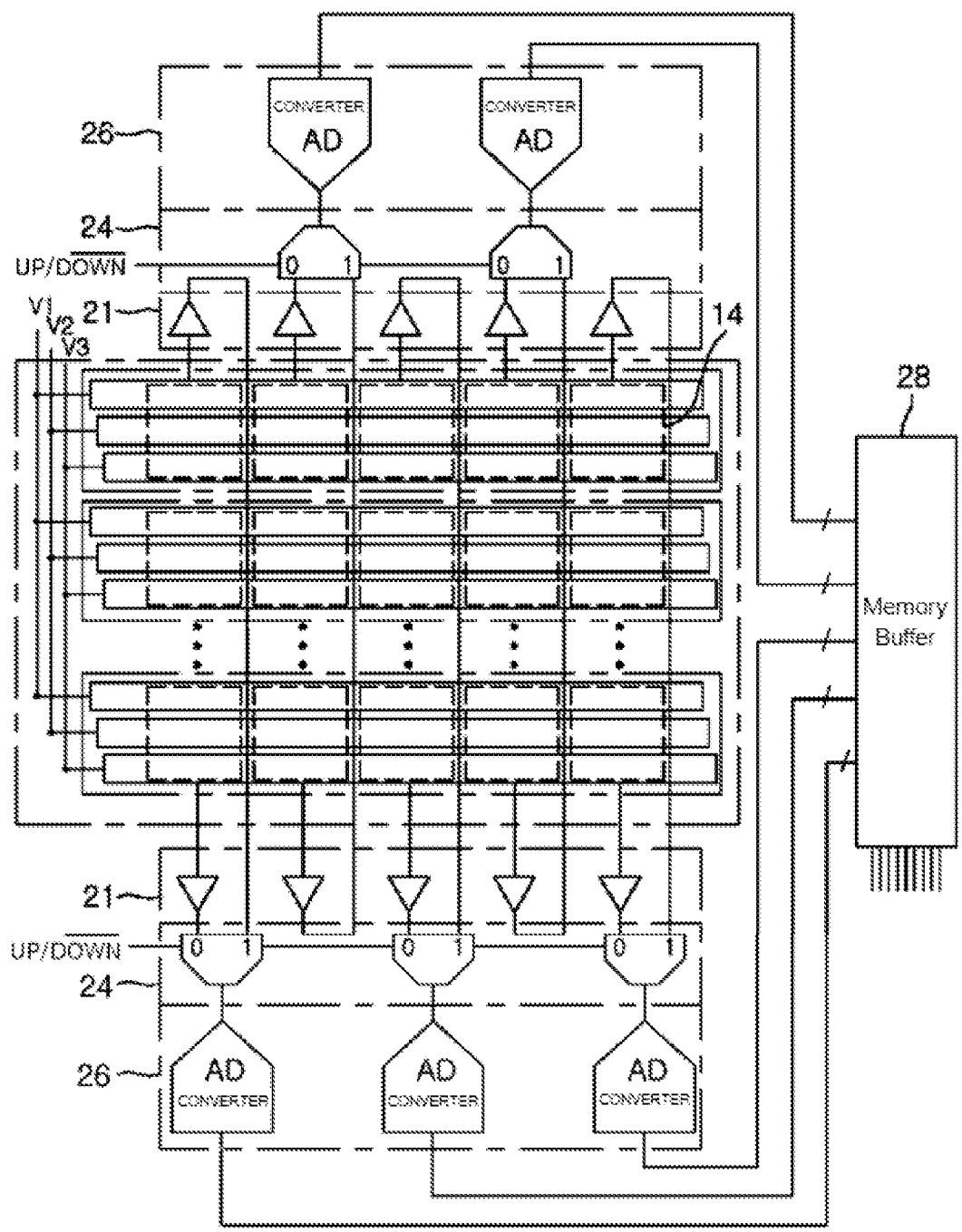
FIG. 2 is a layout diagram of analog-to-digital (AD) converters of the bidirectional TDI line image sensor, which are separately arranged, according to one exemplary embodiment of the present invention.

FIG. 1 is a block diagram showing an exemplary configuration of a bidirectional time delay integration (TDI) line image sensor according to one embodiment of the present invention, and FIG. 2 is a layout diagram of analog-to-digital (AD) converters of the bidirectional TDI line image sensor according to one embodiment of the present invention.

As illustrated in FIGS. 1 and 2, the TDI line image sensor according to one embodiment of the present invention includes a pixel unit 10 and an output unit 20.

The pixel unit 10 includes N line sensors 12_1 to 12_N, each having M charge-coupled devices (CCDs) 14 arranged in the form of a line or strip, wherein the N line sensors 12_1 to 12_N are arranged in parallel with the scan direction. The N line sensors 12_1 to 12_N move, in the scan direction, charges accumulated in respective columns of line sensors 12_1 to 12_N using a TDI method, and accumulate the charges.

That is, the charges accumulated in each of the CCDs 14 are moved to its adjacent CCD 14 by sequentially controlling each CCD 14's voltages V1, V2, and V3, in the stated order or the reverse order depending on the scan direction, to be accumulated at a charge storage node FD and be output.

Since the pixel unit 10 may be a general configuration of a pixel unit of a bidirectional TDI line image sensor, a detailed description of the configuration is not made in the present embodiment.

The output unit 20 receives the charges accumulated in the pixel unit 10 from one line sensor 12 of the first line sensor 12_1 and the last line sensor 12_N, which is selected according to the scan direction, parallelly in respective columns, performs AD conversion on the received charges, stores the resulting signals, and then sequentially outputs the stored signals. To this end, the output unit 20 includes first amplifiers 21, second amplifiers 22, a MUX 24, AD converters 26, and a memory buffer 28.

The first amplifiers 21 receive the charges accumulated in the first line sensor 12_1 of the pixel unit 10 in parallel at corresponding charge storage nodes FD on a column-by-column basis and amplify the received charges, respectively. To this end, the first amplifiers 21 include M first amplifiers corresponding respectively to the CCDs 14 arranged in each line sensor 12.

The second amplifiers 22 receive the charges accumulated in the last line sensor 12_N of the pixel unit 10 in parallel at corresponding charge storage nodes FD on a column-by-column basis and amplify the received charges, respectively. To this end, the second amplifiers 22 include M second amplifiers corresponding respectively to the CCDs 14 arranged in each line sensor 12.

The MUX 24 selects either of the first amplifiers 21 and the second amplifiers 22 according to the scan direction UP/DOWN.

Figure 3:
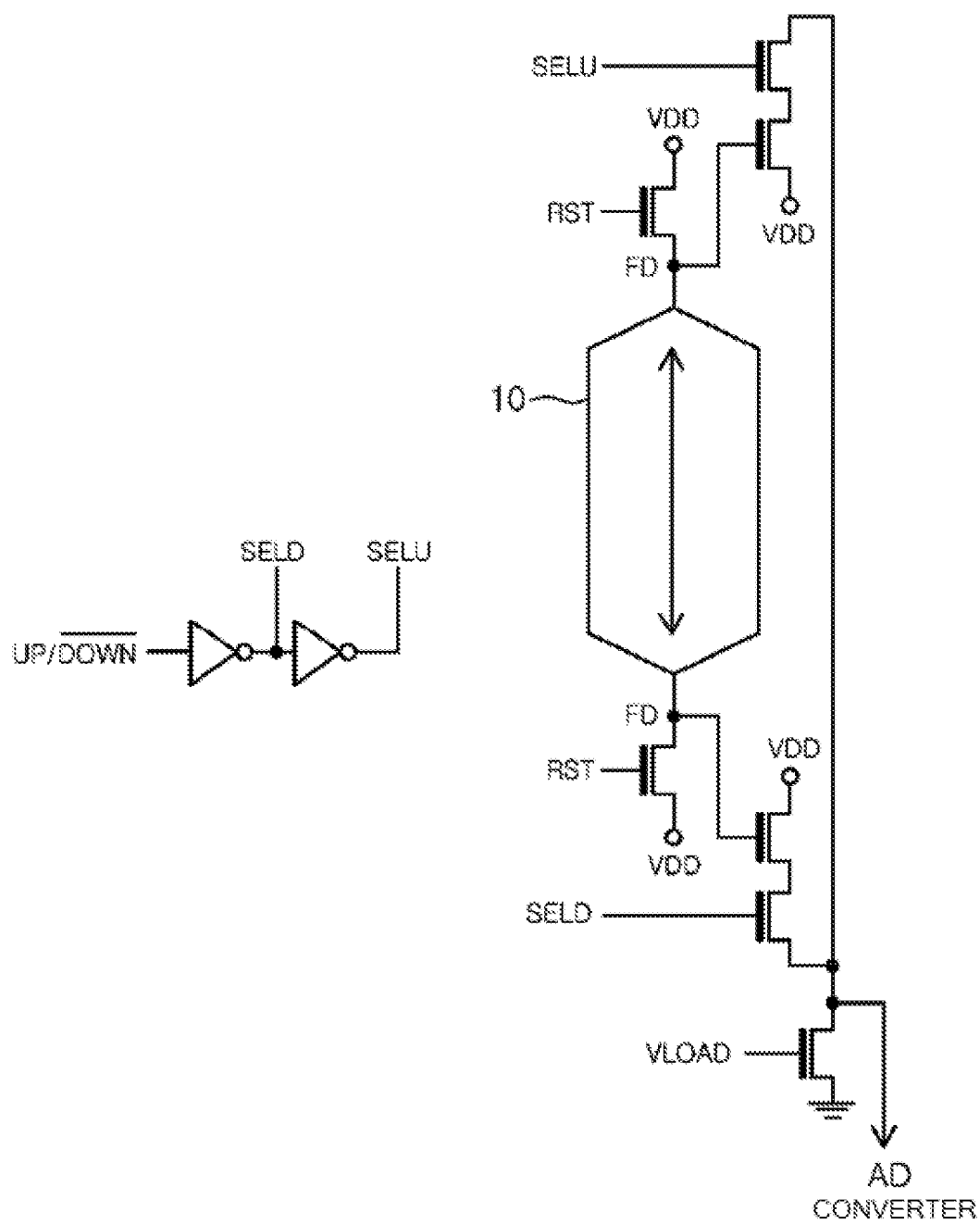
FIG. 3 is a circuit diagram of an amplifier and a MUX of the bidirectional TDI line image sensor according to one exemplary embodiment of the present invention.

FIG. 3 is a circuit diagram of the amplifiers and MUX of the bidirectional TDI line image sensor according to one exemplary embodiment of the present invention.

The operations of the amplifiers and MUX will hereinafter be described with reference to FIG. 3. Either the first amplifiers 21 or the second amplifiers 22 are selected by select signals SELU and SELD corresponding to the scan direction UP/DOWN, and turned on according to potentials of the charge storage nodes FD at which the charges from the first line sensor 12_1 or last line sensor 12_N of the pixel unit 10 are moved and accumulated, so as to output predetermined voltages. To this end, the first amplifiers 21 and the second amplifiers 22 may be configured as source follower amplifiers.

The charges accumulated at the charge storage nodes FD are amplified by the first amplifiers 21 or the second amplifiers 22 and then output to the AD converters 26. Thereafter, the charge storage nodes FD are reset to a VDD voltage by the application of a reset signal RST to receive the charges from the next line sensor 12.

The AD converters 26 AD-convert output signals from the M first amplifiers 21 or M second amplifiers 22, respectively.

Here, the AD converters 26 include M AD converters, which may all be disposed at one side of the pixel unit 10 as shown in FIG. 1 or may be disposed separately in half at both sides of the pixel unit 10 as shown in FIG. 2.

The memory buffer 28 stores image signals, which are converted into digital signals at the M AD converters 26, and then sequentially outputs the image signals and allows a signal processing unit (not illustrated) to process the image signals for each line.

When the bidirectional TDI line image sensor configured in this way performs scanning and imaging, the charges accumulated in the CCDs 14 of each of the line sensors 12_1 to 12_N of the pixel unit 10 using a TDI method are synchronized with the scanning, are moved to an adjacent line sensor 12_1 to 12_N in respective columns thereof, and are output to the charge storage nodes FD of the output unit 20.

As such, a high resolution image can be obtained with a conventional amount of light by configuring the pixel unit 10 including CCDs in accordance with a TDI method.

Further, since the charges stored in the charge storage nodes FD of the output unit 20 are amplified through the amplifiers 22, converted into digital signals in the AD converters 26, stored in the memory buffer 28, and then output without being moved through the CCDs, the degree of integration and also the transmission rate can be improved even with less power consumption due to the use of complementary metal-oxide-semiconductor (CMOS) devices.

In addition, while the scanning is bidirectionally performed, the charges from the first line sensor 12_1 and the charges from the last line sensor 12_N are output in common through one output unit 20, which can lead to the reduction in the device size.

As is apparent from the above description, in a bidirectional TDI line image sensor according to an embodiment of the present invention, a pixel unit includes CCDs configured in a TDI method, and an output unit receives charges of respective columns accumulated in CCDs of first and last line sensors of the pixel unit selectively according to a scan direction, performs AD conversion on the received charges, stores the resulting signals in a memory buffer, and then sequentially outputs the stored signals. Therefore, the resolution and transmission rate can be improved, while power consumption and noise can be reduced, owing to the characteristics of CCDs and CMOS devices. Further, the device size can be reduced owing to the common configuration of the output unit.

While the present invention has been described with reference to the embodiment illustrated in the accompanying drawings, the embodiment should be considered in a descriptive sense only, and it should be understood by those skilled in the art that various alterations and equivalent other embodiments may be made.

Therefore, the scope of the present invention should be defined by only the following claims.

The invention claimed is:

1. A bidirectional time delay integration (TDI) line image sensor, comprising:
   a pixel unit including N line sensors, each having M charge-coupled devices (CCDs) arranged in a line, wherein the N line sensors are arranged in a scan direction and configured to move, in the scan direction, charges accumulated in respective columns of the line sensors and accumulate the charges accumulated in the respective columns in a first line sensor and a last line sensor of the line sensors of the pixel unit; and
   an output circuit configured to receive the charges accumulated in the first line sensor and the last line sensor parallelly in respective columns, selectively according to the scan direction, perform analog-to-digital (AD) conversion on the received charges accumulated in the first line sensor and the last line sensor, store resulting signals, and then sequentially output the stored signals;
   wherein the output circuit comprises
      first amplifiers configured to receive the charges accumulated in the first line sensor parallelly in respective columns at corresponding charge storage nodes and amplify the received charges accumulated in the first line sensor,
      second amplifiers configured to receive the charges accumulated in the last line sensor parallelly in respective columns at corresponding charge storage nodes and amplify the received charges accumulated in the last line sensor,
      multiplexers configured to respectively select either of ones of the first amplifiers and the second amplifiers according to the scan direction,
      AD converters configured to AD-convert output signals from the multiplexers, respectively, and
      a memory buffer configured to store output signals from the AD converters and sequentially output the stored signals; and
   wherein at least one of the AD converters is disposed at one side of the pixel unit, while at least one of other AD converters is disposed at another side of the pixel unit.

2. The bidirectional TDI line image sensor of claim 1, wherein the amplifiers are source follower amplifiers.

3. A bidirectional time delay integration (TDI) line image sensor, comprising:
a pixel unit including N line sensors, each having M charge-coupled devices (CCDs) arranged in a line, wherein the N line sensors are arranged in a scan direction and configured to move, in the scan direction, charges accumulated in respective columns of the line sensors and accumulate the charges accumulated in the respective columns in a first line sensor and a last line sensor of the line sensors of the pixel unit; and
an output circuit configured to receive the charges accumulated in the first line sensor and the last line sensor parallelly in respective columns, selectively according to the scan direction, perform analog-to-digital (AD) conversion on the received charges accumulated in the first line sensor and the last line sensor, store resulting signals, and then sequentially output the stored signals;
wherein the output circuit comprises
first amplifiers configured to receive the charges accumulated in the first line sensor parallelly in respective columns at corresponding charge storage nodes and amplify the received charges accumulated in the first line sensor,
second amplifiers configured to receive the charges accumulated in the last line sensor parallelly in respective columns at corresponding charge storage nodes and amplify the received charges accumulated in the last line sensor,
multiplexers configured to respectively select either of ones of the first amplifiers and the second amplifiers according to the scan direction,
AD converters configured to AD-convert output signals from the multiplexers, respectively, and
a memory buffer configured to store output signals from the AD converters and sequentially output the stored signals; and
wherein at least one of respective pairs of the multiplexers and the AD converters are disposed at one side of the pixel unit, while others of respective pairs of the multiplexers and the AD converters are disposed at another side of the pixel unit.

4. The bidirectional TDI line image sensor of claim 1, wherein respective pairs of the multiplexers and the AD converters are disposed at one side of the pixel unit and at another side of the pixel unit in an alternating manner.

5. The bidirectional TDI line image sensor of claim 1, wherein the output circuit is commonly connected to the line sensors regardless of the scan direction.

6. The bidirectional TDI line image sensor of claim 1, wherein a column of the line sensors is correspondingly connected to one of the first amplifiers, one of the second amplifiers, one of the multiplexers, and one of the AD converters.

7. The bidirectional TDI line image sensor of claim 1, wherein each of the multiplexers is configured to receive a selection signal, receive an input from either one of the first amplifiers and the second amplifiers according to the selection signal, and transmit the received input to each of the AD converters.

8. A bidirectional TDI line image sensor, comprising:
line sensors of a pixel unit, each of the line sensors including a plurality of CCDs arranged in a first direction, and the line sensors being arranged in a second direction perpendicular to the first direction and configured to move, in a scan direction, charges accumulated in respective column sections of the line sensors and accumulate the charges accumulated in the respective column sections in a first line sensor and a last line sensor of the line sensors, the scan direction being either the same as or opposite to the second direction; and
an output circuit configured to receive the charges accumulated in the first line sensor and the last line sensor of the line sensors and comprising selectors configured to select which of the first line sensor or the last line sensor of the line sensors to receive the charges accumulated in the first line sensor and the last line sensor of the line sensors from;
wherein the selectors are multiplexers; and
wherein at least one of the multiplexers is disposed at one side of the pixel unit, while at least one of the other multiplexers is disposed at another side of the pixel unit.

9. The bidirectional TDI line image sensor of claim 8, wherein the multiplexers are analog multiplexers.

10. The bidirectional TDI line image sensor of claim 8, wherein the output circuit further comprises:
first amplifiers configured to receive the charges accumulated in the first line sensor parallelly in respective columns at corresponding charge storage nodes and amplify the received charges accumulated in the first line sensor; and
second amplifiers configured to receive the charges accumulated in the last line sensor parallelly in respective columns at corresponding charge storage nodes and amplify the received charges accumulated in the last line sensor.

11. The bidirectional TDI line image sensor of claim 10, wherein the selectors are further configured to select either of ones of the first amplifiers and the second amplifiers according to the scan direction.

12. The bidirectional TDI line image sensor of claim 8, wherein the output circuit further comprises:
AD converters configured to AD-convert output signals from the multiplexers, respectively; and
a memory buffer configured to store output signals from the AD converters and sequentially output the stored signals.

13. The bidirectional TDI line image sensor of claim 10, wherein the amplifiers are source follower amplifiers.

14. The bidirectional TDI line image sensor of claim 12, wherein at least one of the AD converters is disposed at one side of the pixel unit, while at least one of the other AD converters is disposed at another side of the pixel unit.

15. The bidirectional TDI line image sensor of claim 8, wherein the output circuit is commonly connected to the line sensors regardless of the scan direction.

* * * * *